United States Patent [19]

Botts et al.

[11] Patent Number: 4,643,809
[45] Date of Patent: Feb. 17, 1987

[54] PROCESS FOR ELECTROCHEMICALLY GASIFYING COAL USING ELECTROMAGNETISM

[75] Inventors: Thomas E. Botts, Markham, Va.; James R. Powell, Shoreham, N.Y.

[73] Assignee: The United States of America as represented by the United States Department of Energy, Washington, D.C.

[21] Appl. No.: 791,236

[22] Filed: Oct. 25, 1985

[51] Int. Cl.⁴ .............................................. B01J 19/12
[52] U.S. Cl. .................................. 204/155; 204/101; 204/129; 48/197 R; 48/202
[58] Field of Search ............... 204/101, 129, 155; 48/197 R, 200–202, 210

[56] References Cited

U.S. PATENT DOCUMENTS

| | | | |
|---|---|---|---|
| 1,709,814 | 4/1929 | Henry | 204/155 |
| 1,709,815 | 4/1929 | Henry | 204/155 |
| 2,097,489 | 11/1937 | Kiss | 204/155 |
| 3,059,110 | 10/1962 | Japolsky | 250/41.9 |
| 4,226,683 | 10/1980 | Vaseen | 204/129 |
| 4,263,111 | 4/1981 | Hooper et al. | 204/129 |
| 4,268,363 | 5/1981 | Coughlin | 204/101 |
| 4,279,710 | 7/1981 | Coughlin | 204/129 |
| 4,389,288 | 6/1983 | Vaughan | 204/101 |

FOREIGN PATENT DOCUMENTS

| | | | |
|---|---|---|---|
| 2535358 | 2/1976 | Fed. Rep. of Germany | 204/129 |
| 71993 | 4/1983 | Japan | 204/155 |
| 477018 | 3/1936 | United Kingdom | 204/155 |

OTHER PUBLICATIONS

Okada et al, "On the Electrolysis of Coal Slurrier", J. Elect. Chem. Society, vol. 128, No. 10, pp. 2097–2102.
Coughlin et al, "Electrochemical Classification of Coal"; Ind. Engineer Chem. Process Design Developt., pp. 211–219, vol. 19, No. 2 (1980).

Primary Examiner—Terryence Chapman
Attorney, Agent, or Firm—Vale P. Myles; Paul A. Gottlieb; Judson R. Hightower

[57] ABSTRACT

A process for electrochemically gasifying coal by establishing a flowing stream of coal particulate slurry, electrolyte and electrode members through a transverse magnetic field that has sufficient strength to polarize the electrode members, thereby causing them to operate in combination with the electrolyte to electrochemically reduce the coal particulate in the slurry. Such electrochemical reduction of the coal produces hydrogen and carbon dioxide at opposite ends of the polarized electrode members. Gas collection means are operated in conjunction with the process to collect the evolved gases as they rise from the slurry and electrolyte solution.

13 Claims, 8 Drawing Figures

PROCESS FOR ELECTROCHEMICALLY GASIFYING COAL USING ELECTROMAGNETISM

The U.S. Government has rights in this invention pursuant to Contract Number DE-AC02-76CH00016, between the U.S. Department of Energy and Associated Universities Inc.

BACKGROUND OF THE INVENTION

The invention relates to a process for electrochemically gasifying coal and, more particularly, to a process by which either hard or soft coal can be reduced to combustible gases that are relatively free of other gaseous contaminants, such as sulfur content gases that are typically produced in known prior art coal gasification processes.

The advantages of producing synthetic gases from solid fuels, such as coal or peat, have long been well known. Relatively greater efficiencies realizable in the utilization of gaseous fuels versus solid fuels, coupled with the availability of large reserves of coal, peat and tar sands or shale, have provided strong impetus in recent years for the development of more commercially feasible processes for reducing solid fuels to gaseous fuels.

In the context of prior art coal gasification processes, the term "gasification" is ordinarily used to refer to processes that use high gasification temperatures, i.e. temperatures in the order of 1000° C. or more. When hard coal is gasified at such temperatures nearly complete conversion of the organic mass of the coal into combustible gases is achieved by supplying oxygen, hydrogen, water or carbon dioxide to the coal while it is maintained at the elevated temperature and under a suitable pressure. In addition to the carbon monoxide, carbon dioxide and hydrogen gases that are produced in such processes, it is also normal to find nitrogen, hydrogen sulfide and COS gases present in the output of such coal gasification processes. The presence of such undesirable contaminant gases usually requires the use of subsequent cleaning and conversion steps to either separate or filter out the undesired gases, or to crack the hydrocarbons in a suitable methanation reaction, thereby to form methane and water. These limitations have, heretofore, prevented the development of any suitably high volume, commercially feasible processes for producing inexpensive and relatively pure fuel gases from coal.

Up until about the mid 1970's, there existed three well known processes for achieving coal gasification. Of those processes, the one most widely now used by industry is the so called Lurgi process. In the Lurgi process a stationery fuel or so-called fixed bed fuel is used to achieve coal gasification at a predetermined pressure. It is now generally known that the heating value of gases thus produced can be improved by increasing the pressure under which the coal is gasified.

A somewhat older process, known as the Winkler process, was introduced about the year 1926. In the Winkler process either hard or soft coal is gasified in a moving or fluidized bed that is maintained at ambient pressure. This process produces high gas yields relative to those from the Lurgi process, but also requires high gasification temperatures and subsequent cleaning, filtering or cracking of the resultant gases, in order to obtain essentially pure hydrogen and carbon dioxide product gases.

A refinement of the Winkler process was developed in the early 1950's and is called the Koppers-Totzek process. In that process coal must be ground into very fine particulate before it is gasified at ambient pressure. This process is more efficient than the two earlier-mentioned processes, but it also requires gasification temperatures of about 2000° C., and it produces gases that must be filtered, cleaned or cracked in order to secure relatively pure hydrogen and carbon dioxide gases.

In addition to these three basic coal gasification processes, each of which is in fairly widespread usage, a number of additional gasification processes were developed, at least to the prototype or experimental stage, during the 1970's and early 1980's. Although it is difficult to generally characterize these more recent gasification processes, many of them are operated by reacting pure hydrogen in a hydropyrolysis reactor in order to produce methane. The earlier of these prototypical processes normally use a selected synthetic gas (syngas) in such a reaction step, to produce the desired methane. For the methanation step in such a reactor, the later of these recent processes also require secondary process steps, such as the generation of hydrogen for the methanation reaction which is usually done by char gasification and an associated shift conversion and removal of carbon dioxide. Subsequently, it is necessary to remove the excess hydrogen that is required in the methanation step. It is known that such separation can be achieved cryogenically so that the excess hydrogen can be recycled to the gasifier.

Besides such potentially high volume coal gasification processes, some small-scale experiments have been conducted to determine the feasibility of electrochemically gasifying coal to produce directly relatively pure hydrogen, carbon dioxide and water. An advantage of this technique is that it eliminates the difficulties and expenses associated with cleaning and filtering or cracking the contaminant gases normally found in the commercial coal gasification processes. Some of the test results achieved with such electrochemical processes are discussed by Messrs. R. W. Coghlin and M. Farooque in a paper entitled "Electrochemical Gasification of Coal . . . ", which was published during 1980 by the American Chemical Society, in Industrial Engineering Chemical Process Design Development, at pages 211-219, Vol. 19, No. 2 (1980). The tests reported in that paper indicate that a recently developed electrochemical process operates to convert coal and water into two separate gaseous products comprising essentially gaseous oxides of carbon and pure hydrogen. The chemical reaction takes place at mild temperature, such as normal room temperatures, and the gaseous products are essentially free of impurities such as ash, tar and sulfur compounds of the type normally associated with other prior art coal gasification processes. In the type of electrochemical gasification cell described in that paper, the desired gasification is achieved by applying a relatively low electric potential, around 0.21 volts, to a coal water slurry contained in a beaker in which two platinum mesh electrodes are suspended. The tests described also established that by increasing the coal-to-electrolyte loading within the cell it was possible to cause about a ten-fold increase in oxidation current. The influences of temperature and electrode potential, as well as those of other process parameters, were briefly explored, as functions of their effects on activation temperature.

In another paper entitled, "On the Electrolysis of Coal Slurries", authored by Messrs. G. Okada, V. Guruswany and J. Brockris of the Department of Chemistry, Texas A&M University, and published in the Journal of the Electrochemical Society, Vol. 128, No. 10, October 1981, the results of experiments which establish the feasibility of electrolyzing coal slurries to produce essentially pure $CO_2$ and $H_2$ are described. In the tests reported in that paper, a simple electrolysis cell utilizing two electrodes immersed in a coal slurry and electrolyte mixture was used to achieve a successful electrolysis of coal.

Although the operability of such electrolysis reactions are of interest in studying alternative coal gasification processes, it is apparent that in order to adapt their teachings for possible use in suitably high volume commercial gasification process apparatus some additional means would be necessary for suitably protecting the electrodes from becoming quickly poisoned or blocked by evolved gases. Also, it would be necessary to develop means for economically supplying electricity to electrodes that could present high surface area exposure to the coal slurry and electrolytes used in practicing such processes. The foregoing papers only broadly describe the types of apparatus that might be usable to achieve such high volume, continuous electrochemical coal gasification process applications.

OBJECTS OF THE INVENTION

A primary object of the present invention is to provide an electrochemical process for gasifying coal at relatively low reaction temperatures and with only relatively low voltage levels needed across the reaction chamber used in the process.

A further object of the invention is to provide an electrochemical process in which electrolysis of a coal-water slurry is achieved to produce essentially pure hydrogen and carbon dioxide gases at voltages significantly below those required for electrolysis of water.

Another object of the invention is to provide a continuous coal slurry gasification process that utilizes magnetohydrodynamic (MHD) effects to provide the electrical energy required for an electrolysis step used in the process.

Additional objects and advantages of the invention will become apparent to those skilled in the art from the description of it contained herein, considered in conjunction with the accompanying drawings.

SUMMARY OF THE INVENTION

In one preferred arrangement of the process of the invention a stream of coal-water slurry, electrolyte and a plurality of electrode members is established so that the stream flows transversely through a magnetic field of predetermined strength. The strength of the magnetic field is made sufficiently strong to polarize the electrode members and cause them to operate in combination with the electrolyte to electrochemically gasify the coal particulate in the slurry, thereby to generate $H_2$ and $CO_2$ gases at opposite ends of the respective electrode members. Gas collectors are operatively positioned to collect the evolved gases as they rise from the stream of slurry and electrolyte. In modifications of the inventive process, the portion of the stream that is subjected to the magnetic field is confined in a suitable channel that is defined by a hollow conduit in which dielectric baffles are mounted for the purpose of confining the stream of slurry, electrolyte and electrode members in a preselected pattern that results in all of the electrode members being exposed to essentially the same strength of magnetic field.

DESCRIPTION OF THE PREFERRED EMBODIMENT

Figure 1:
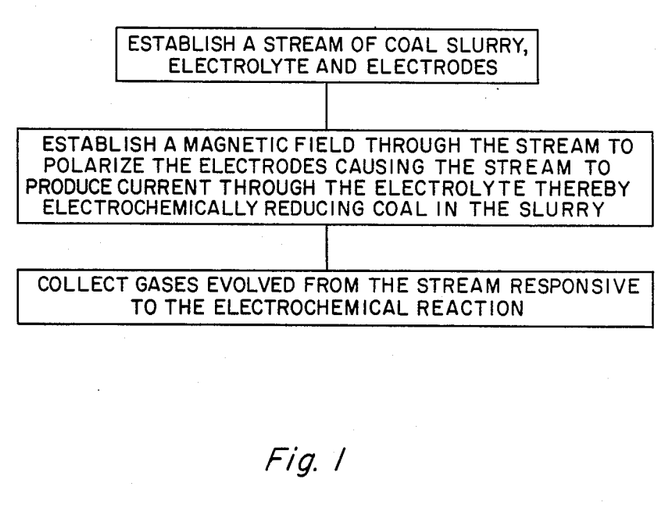
FIG. 1 is a flowchart showing the basic steps of the inventive process.

The process steps used in practicing the preferred arrangement of the invention to provide the desirable objectives noted above can be quickly understood by referring to FIG. 1 of the drawing. As shown there, the first basic step of the process of the invention is to establish a flowing stream that includes a slurry of coal particulate and a suitable slurry liquid, a plurality of electrode members that are distributed in the slurry, and an electrolyte that is maintained in electrically conducting relationship with the electrode members and the slurry. According to the process of the invention, a magnetic field is established through the stream of slurry, electrolyte and electrode members in order to polarize the electrode members, due to magnetohydodynamic effects, thereby to cause them to produce with the electrolyte an electrochemical reaction that reduces the coal in the slurry. Finally, to complete the process of the invention the gases thus produced from the coal are collected by a gas collector when they are evolved from the stream as the electrode members are moved through the magnetic field.

Figure 2:
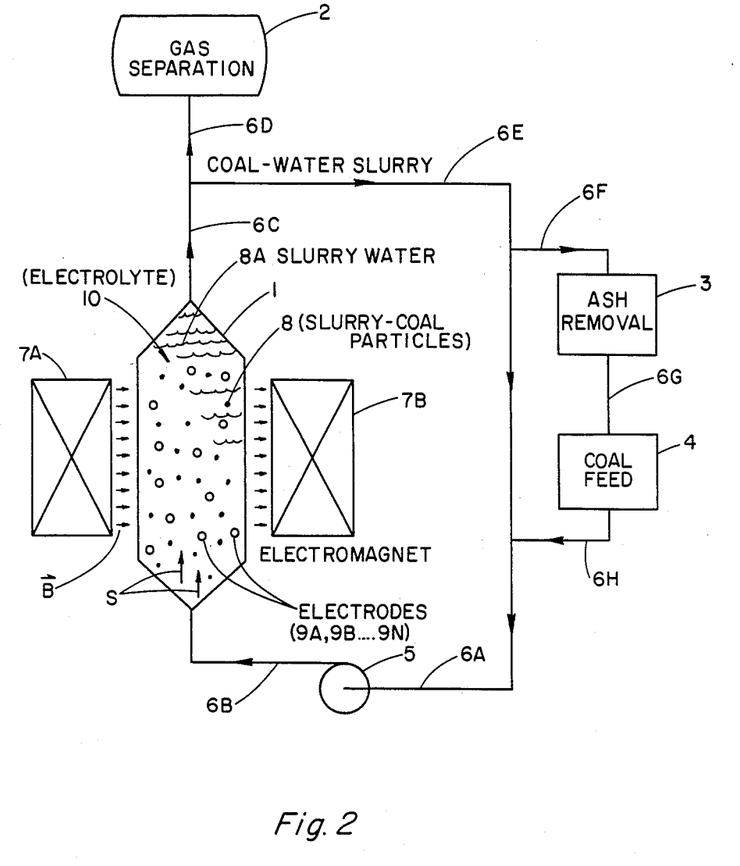
FIG. 2 is a schematic circuit drawing illustrating a coal gasification process in which electrochemical gasification of a coal slurry is achieved by using magnetohydrodynamic effects according to the process of the invention.

It will be apparent that various different types of well known apparatus, and alternative arrangements of such apparatus, may be used in successfully practicing the method of the invention; however, a preferred arrangement of suitable apparatus is illustrated in FIG. 2 to describe one embodiment of the invention. As shown in FIG. 2, the preferred process of the invention can be practiced by providing a suitable fluid-conducting conduit system that interconnects a reaction chamber 1 and a gas collector 2, as well as an ash removal container 3 and a suitable coal particulate feed container 4. According to the invention, a stream (S) of coal particulate and liquid slurry, electrolyte and electrode members is circulated through at least part of the conduit by a suitable conventional circulation pump 5 that is operatively connected between pump inlet conduit, or pipe, 6A and pump outlet pipe 6B, which also feeds the stream into an electrochemical reaction chamber 1. The stream is exhausted from the chamber 1 through a suitable conventional pipe or other conduit 6C that has a branch 6D, which is connected to the gas collector or separation chamber 2. It will become apparent, as the description of the invention proceeds, that the electrode members that are in the stream, while it is passing through the reaction chamber, may be removed from the stream as it enters other parts of the conduit system. Also, the pipe 6C connects with a second branch pipe 6E, which feeds the bulk of the coal slurry stream to the pump inlet pipe 6A, but which also feeds a portion of the stream through another pipe 6F into the ash removal container 3. Another pipe 6G interconnects the ash removal chamber and the coal feed container 4, and a final pipe 6H connects the coal feed container to the pump inlet pipe 6A, all as shown in FIG. 2.

In order to establish a desired magnetic field through a preselected portion of the stream (S), of slurry, electrolyte and electrode members, according to the process of the invention, an electromagnet 7A-7B is positioned with its poles on opposite sides of the reaction chamber 1, thereby to establish, when the magnet is energized, a magnetic field (B) of predetermined strength transversely through a portion of the stream (S). As noted above, the stream (S) while it is in the reaction chamber 1 includes a slurry 8 of coal particulate (only partially shown in FIG. 2) and a suitable slurry liquid 8A, which in the preferred embodiment is water. Also, the stream (S) includes a plurality of electrode members 9A, 9B, etc. which are distributed throughout the slurry 8. Finally, an electrolyte, designated by the numeral 10 is maintained in electrically conducting relationship with the electrode members and the slurry, as indicated generally by the fluid electrolyte symbols (10) shown in FIG. 2. It should be understood that the slurry 8, the electrodes 9A, 9B–9N, and the electrolyte 9 are all essentially homogeneously distributed throughout the volume of the reaction chamber 1 by the movement of the flowing stream (S) through the chamber. Also, it should be appreciated that for the MHD effects of the inventive process to be produced in the process of the invention it is only necessary to disperse the electrode members 9A-9N in the stream (S) while it is traversing the magnetic field B in reaction chamber 1. Accordingly, the electrode members can be filtered from the stream (S) as it leaves chamber 1, in some modification of the invention. Alternatively, if small electrode members are used, which can be readily circulated through the remainder of the conduit system, the electrode members can remain in stream (S).

Figures 3, 4:
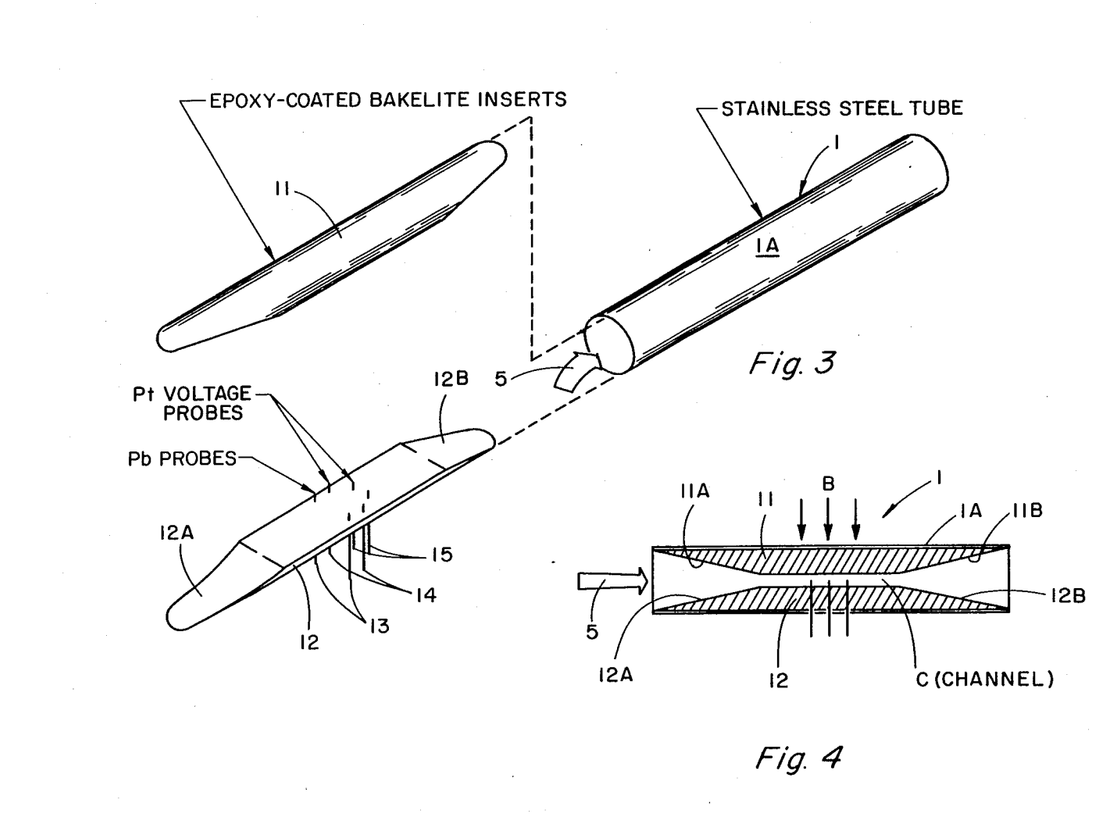
FIG. 3 is an exploded, perspective view of a section of conduit used in the system shown schematically in FIG. 2, and illustrates in articulated form a pair of dielectric baffles that are used to confine the coal-water slurry, electrolyte and electrode member stream in a desired pattern that optimizes the practice of the invention as it is applied in a continuous coal gasification process.
FIG. 4 is a side view, in cross section, showing the section of conduit illustrated in FIG. 3, with the two dielectric baffle members mounted in operative position therein.

Although it will be apparent that many different configurations of reaction chamber may be used in practicing the process of the invention, in the preferred arrangement disclosed herein a reaction chamber configuration that is particularly preferred is illustrated in FIGS. 3 and 4, to which reference may now be made. As shown in FIGS. 3 and 4 the reaction chamber 1 in this embodiment comprises a hollow conduit 1A that is formed of non-magnetic material such as stainless steel or an acid-resistant plastic, and that is shaped to confine the stream (S) within a predetermined channel in the portion of the stream through which the above-mentioned magnetic field B is established in practicing the process of the invention. As best seen in the cross-sectional view of FIG. 4, the channel thus defined is designated by the letter C. The channel C is limited on its two sides by the walls of the conduit 1A, and is defined on its upper and lower surfaces by the generally flat, facing surfaces of the dielectric inserts 11 and 12. These inserts are spaced apart a distance that is slightly greater than the diameter of the electrode members 9A–9N (shown as spheres of electrically conductive metal of generally uniform diameter, in FIG. 2). That spacing forces the electrode members to be distributed in a single layer in the portion of stream S that is subjected to the magnetic field B, thus, each of the electrode members is subjected to a magnetic field of substantially the same strength as all of the other members while they pass through that portion of the reaction chamber 1. The inserts 11 and 12 are further characterized by including inclined ramp surfaces 11A, 11B and 12A, 12B on their respective opposite ends. These surfaces operate to smoothly focus the generally spherical electrode members 9A–9N in the portion of the reaction chamber 1 that is subjected to the magnetic flux B.

Although not required to practice the process of the invention, it will be seen from an examination of FIG. 3 that the dielectric insert 12 is also provided with three sets of voltage probes, which can be used to measure the voltage drop across the reaction chamber 1 when the inventive process is in operation, as well as to measure the current density within the reaction chamber 1. Thus, a first pair of lead probes 13 is spaced upstream from a second pair of platinum probes 14, which in turn are upstream from another pair of platinum probes 15. As shown in FIG. 3, the inner ends of these respective probes extend above the generally flat surface of the insert 12 far enough to achieve good electrical contact with the stream of electrolyte and slurry that is passed through the reaction. Chamber during operation of the process of the invention. Those protruding ends of the probes do not extend far enough above the surface of the insert 12 to prevent the electrode members 9A–9N from flowing through the reaction chamber. The outer ends of the probes 13–15 may be provided with any suitable conventional electrical coupling means for connecting them to voltmeters and ammeters, in order to effect the kinds of test measurements that will be generally described more fully below.

Now that a suitable gasification system arrangement (shown in FIG. 2,) and a brief description of suitable types of apparatus for practicing the process of the invention have been generally described, it will be understood by those skilled in the art that alternative systems and modifications of the type of apparatus disclosed herein may be utilized in practicing the process of the invention without departing from its intended scope. For example, in the preferred arrangement of the process of the invention the slurry 8 should include about 10%$_{bw}$ coal particulate, within a broader generally preferred range of 5%$_{bw}$ to 70%$_{bw}$ particulate that has been found to be suitable for practicing the invention. (As used herein "%$_{bw}$" means percent by weight.) We have also found that many different types of electrolyte (10) can be used in achieving the objectives of the invention. However, when practicing the process with the preferred 10%$_{bw}$ coal particulate slurry, we have found it particularly advantageous to utilize an electrolyte 10 that comprises about 5 to 10 Normal (N) acid that is taken from the group comprising sulfuric acid, phosphoric acid, acetic acid, or trifluoromethane-sulfonic acid. In that arrangement of the invention, the electrode members 9A–9N are made in substantially spherical configuration and are made of metal that has an electrical conductivity which is substantially higher than the electrical conductivity of the coal-liquid slurry 8–8A. Specifically, in the preferred arrangement of the process the electrode members are made of stainless steel and are general spherical in configuration so that they roll smoothly along the ramp 12A of the insert 12 and are distributed in a single layer within the channel C between the inserts 11 and 12, because the height of the channel C is made only slightly greater than the diameter of the spherical electrode members.

To achieve the desired voltage drop across the reaction chamber 1, which is a function of the current established by the strength of the magnetic field B through the electrode members and the electrolyte, the magnetic field B is made at least greater than about 2 Tesla, and in the preferred arrangement of the invention, the predetermined strength of the magnetic field B is made about 4 Tesla. It should be understood that still greater magnetic field strengths will enhance the rate of electrochemical reduction in the coal in slurry 8.

The dielectric inserts 11 and 12 may be made of any suitable material such as Bakelite, which inserts in the preferred embodiment are resin coated with a suitable conventional epoxy coating. The inserts 11 and 12 are fixed in their facing position, as shown in FIG. 4, by any suitable securing means, such as an adhesive or mechanical fasteners (not shown), which bond or otherwise fasten them to the inner walls of the conduit 1A. In the preferred arrangement of the invention, the conduit 1A is made of stainless steel pipe, but as noted above other suitable non-magnetic materials may be used to form this reaction chamber portion of conduit. Alternatively, the stream S may be confined in a suitable flow pattern by an open channel, rather than by a tubular conduit such as the illustrated conduit 1A. In that regard it will be recognized that a basic purpose for the stream confinement afforded by the channel or conduit (1A) is to cause the magnetic field B to traverse substantially the complete cross section of the stream S and all of the electrode members, while the steam is within the confining channel or conduit area that is subjected to the field B.

As indicated by the references discussed above in the background portion of the specification, it is generally known that temperature variations will affect the rate of electrochemical reaction in a coal slurry electrolysis process. It has been found in practicing the process of the invention that the temperature of the stream S, as it flows through the magnetic field B, should preferably be maintained in the range of normal room temperatures. For example, it has been found that the process of the invention can be readily practiced to produce desirable amounts of $H_2$ and $CO_2$ when the slurry temperature and the ambient temperature around the reaction chamber 1 are maintained in a range of temperatures of about 20° C. to about 100° C., but most preferably the process is performed with the slurry and ambient temperature around the chamber 1 maintained at about 75° C. In such a case, the current density in the portion of the electrolyte 10 that is within the magnetic field B has been found to be maintained in the range of about 1.5 to 3.0 mA/cm$^2$.

It has been found that it is particularly desirable to assure free rotation of the electrode members 9A–9N as they move through the magnetic field B, in order to prevent the build-up of blocking gases from poisoning the gas-evolving capability of the electrode members as they are polarized by the MHD effect resulting from their flow through field B. Thus, the velocity of flow of the stream S, in combination with the strength of the magnetic field B, is made effective in practicing the invention to cause a relatively linear movement between the slurry 8 and the electrode members 9A–9N, which movement is maintained in the range of about 3 to 10 meters per second in a preferred arrangement of the process of the invention. Such relative movement is effective to cause the slurry to scrub gas from the surfaces of the electrode members. Also, the movement of the electrode members along the ramp portions and along the generally flat facing surfaces of the inserts 11 and 12 in the reaction chamber 1 is such that the electrode members are free to rotate as they move through the magnetic field B. Such rotation is effective to further assist in scrubbing gas from the surfaces of the electrode members, so that essentially the entire surface area of each of the electrode members are subjected to the combined scrubbing action as the members move through the magnetic field B. By maintaining the electrode members in an unpoisoned, clean condition by such scrubbing, the electrochemical reduction of coal in the slurry 8 is maintained at a desirably high volume rate in practicing the process of the invention.

EXPERIMENTAL RESULTS

In order to test the operability of the process of the invention, in addition to testing the type of reaction chamber 1 illustrated in FIGS. 3 and 4, some experiments with the electrochemical reaction aspects of the process were performed using a simple electrolysis cell. One such test cell comprised a conventional Pyrex beaker containing an electrolyte solution of 5N sulfuric acid and a coal-water slurry comprising about 10%$_{bw}$ coal particulate. A Plexiglass barrier was positioned at the midpoint of the beaker and was sealed to the beaker with a silicone sealant to separate an anode and a cathode that were immersed in the electrolyte and slurry on opposite sides of the barrier. The anode and cathode electrodes were made of platinum gauze and they were energized by a conventional source of direct current electric potential to provide a constant current supply of power to the electrodes. A window of about 5 mil thick non-reinforced Nafion (a solid sulfonated fluoropolymer manufactured by E. I. DuPont De Nemours, Inc. of Wilmington, Del.) is provided through the Plexiglass barrier to allow ion conduction between the anode and cathode electrodes. A suitable conventional stirring mechanism was immersed in the electrolyte to circulate it over the anode side of the Plexiglass barrier at a flow rate of about 1 gallon per minute. Circulation of the electrolyte and slurry solution was maintained past the anode at about a flow rate of 5 meters per second. Thus, the electrolyte and slurry stream was continuously mixed and maintained in intimate contact with the electrode surfaces. Tests performed with this cell arrangement established that by increasing the flow rate of the electrolyte and slurry past the electrodes, the current density could be made to increase proportionately. Moreover, as the concentration of coal particulate in the slurry was increased, the current density was also shown to increase proportionately.

In tests with such a cell, gas samples were collected as they evolved off of the anode electrode. To form a suitable gas collection chamber, a Pyrex U-shaped tube with a conventional ground glass petcock and a ground glass cone seal at each of its ends was connected through a matching hole in the upper surface of a cover on the Pyrex beaker containing the electrolyte and slurry. The gaseous volume above the electrolyte and slurry solution in the beaker was about 50 cubic centimeters. Prior to conducting a test run, a stream of high purity helium gas was passed through the gas collecting sample tube and void space above the electrolyte-slurry solution for about 15 minutes at a rate of approximately 560 cubic centimeters per minute. Gas samples of the gas evolved from the anode, during electrolysis of a coal slurry solution in the experimental beaker arrangement, were then collected in the Pyrex U-shaped tube and analyzed using a conventional mass spectrometer. With test run times of about 1 hour, a relatively large fraction, i.e., greater than about 10%, of evolved $H_2$ and $CO_2$ was produced in the cover helium gas. A conventional bubbler was used to separate the cover gas from air and to allow operation of the experiment at a constant pressure.

It was found in performing such experiments that when operation of the process was done with potentials between the anode and cathode electrodes mentioned above approximately 1.5 volts, diatomic oxygen formed on the anode surface, and the active sites tended to become passivated. Such poisoning or blocking of the electrodes was successfully counteracted by forming hydrogen at the electrodes at the beginning of each series of measurements of the coal-slurry electrode, by reversing the polarity of the power supply and driving the cell at greater than 2.0 volts. That refreshing procedure was carried out for about 5 minutes prior to each series of test measurements described herein.

In order to test the type of magnetically driven electrolysis cell shown in FIGS. 3 and 4, a system generally similar to that illustrated in FIG. 2 was established, absent the provision of an ash remover 3 and coal feed means 4. In that test arrangement, rather than utilizing a conventional source of energizing current or fixed electrodes, such as those discussed above in relation to the tests done in a conventional Pyrex beaker, this second test arrangement utilized the magnetohydrodynamic (MHD) effects that characterize the process of the present invention, in order to provide the necessary electrical energy for the electrolysis effect. A stream of 5 Normal acid electrolyte solution and 10%$_{bw}$ coal particulate slurry solution was pumped through the magnetic field (B) which was established through the reaction chamber 1 at a strength of about 2.0 Tesla. The electrolyte was found to have a significant conductivity of greater than about $5.0 \times 10^4$ ohms/meter, which was effective to set up a potential across the flowing stream of slurry, electrolyte and electrodes in a manner similar to a conventional MHD channel. In an experiment with such apparatus using a magnetic field of about 2.0 Tesla, and an electrolyte strength of 5N sulfuric acid, and at about normal room temperature, it was found that over 1 volt potential was established between electrodes, such as the platinum probes 14 shown in FIG. 3.

In this test configuration, the three sets of electrodes 13, 14 and 15, as shown in FIG. 3 were mounted through the dielectric insert member 12. The pairs of electrodes 14 and 15 were bare platinum electrodes at their inner ends, while the pair of electrodes 13 were lead probes. In order to test the configuration of the reaction chamber 1 shown in FIGS. 3 and 4, rather than utilizing moveable electrode members 9A–9N (as shown in FIG. 2), in one test a fixed platinum wire was suspended with its opposite ends close to the lead probes 13, in order to obtain a reference to the center tap of the central platinum wire. The suspended platinum wire thus simulated the electrode members 9A–9N to test the electrolysis effects of the process of the invention. Separate experiments with such a suspended wire in an electrolyte and coal slurry solution were used to establish that the wire would operate in conjunction with the electrolyte solution to generate gas at the opposite ends of the wire, and along the length of the wire, until the separating distance between such test points on the wire was found to be unsufficient to drive the electrolysis action.

The closely spaced pair of platinum electrodes 15 were used in conjunction with the more widely spaced platinum electrodes 14 in order to see if any gross distortion of the electric field through the electrolyte occurred near the walls of the test reaction chamber conduit 1A. No such gross distortion was measured during those tests.

In conducting tests with the type of reaction chamber 1 shown in FIGS. 3 and 4, New Mexico subituminous coal powder particulate was used to form the coal slurry particulate solution. Cell potential as a function of current density and temperature were the primary output results obtained in these studies for the electrically driven electrolyzers. Measurements of induced emf as a function of applied magnetic field B was a primary output from the tests done on the magnetically driven cell.

In conducting the test, no surfactant was added to the coal slurries. With the lightly loaded, i.e. about 10%$_{bw}$ coal, it was found that no such surfactant was needed to assure a smooth continuous flow of the slurry solution through the reaction chamber.

Figure 5:
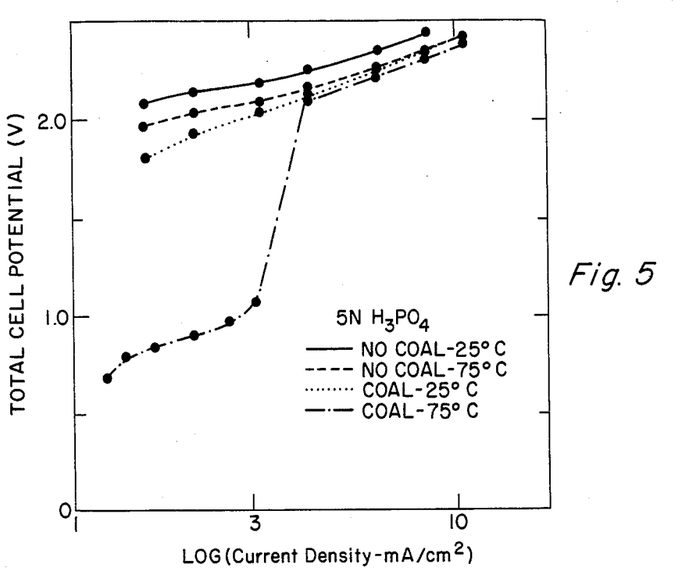
FIG. 5 is a graph showing test data that was developed by operating a cell filled with coal-water slurry, a five Normal phosphoric acid (5N $H_3PO_4$) electrolyte and electrode members, to prove the feasibility of the process of the invention for gasifying coal at either 25° C. or at 75° C. Total cell potential is shown plotted versus current density.

FIG. 5 is a graph on which there are plotted curves showing total cell potential as a function of current density, for test runs on a reaction chamber of the type shown in FIGS. 3 and 4, wherein 5 Normal phospheric acid solution was used as the electrolyte. In those tests 10%$_{bw}$ coal particulate was used in the coal slurry. The Tafel plots showing voltage against log of current densities of FIG. 5 were used in order to demonstrate that Joule losses do not appear to change significantly with the addition of denser concentrations of coal to the coal slurry and electrolyte solution that was used on the anode side of the test cell. In this test the cell was like the described above wherein a Pyrex beaker was used with a Nafion screen between anode and cathode electrodes. From the curves shown in FIG. 5 it will be noted that although the electrical conductivity of the solution of slurry and electrolyte is only slightly altered by the presence of coal at 75° C., the coal slurry does demonstrate a significant voltage drop in the presence of the 5N phospheric acid electrolyte. It will also be noted that on either side of that transition point, the slope of the curve is nearly the same as that at either 25° or 75° C., in the absence or presence of a coal slurry. The decrease in measured cell potential is associated with the polarization of the cell, which is not dependent upon the current flow. The limiting current density was observed to be only about 3.0 mA/cm² for the 5N phospheric acid repeatedly observed, and recovery appeared to be complete.

Figure 6:
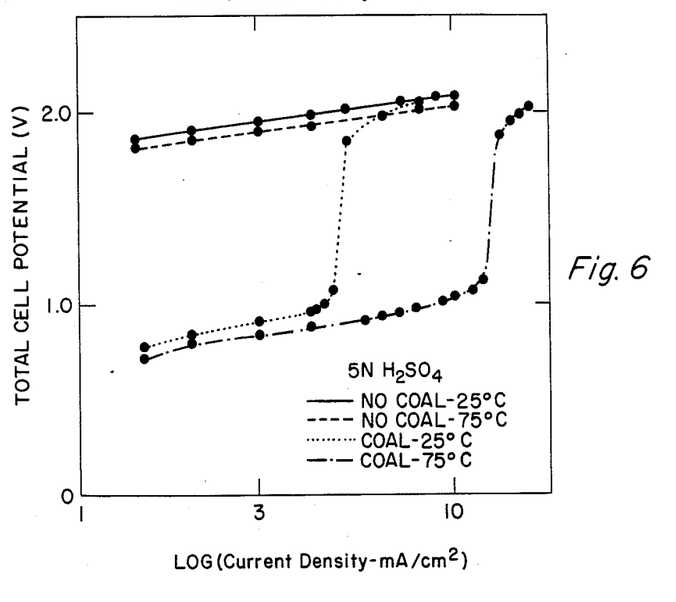
FIG. 6 is a graph of data obtained by operating a cell similar to that used for producing the data of FIG. 5, except that the electrolyte is 5N $H_2SO_4$ acid. The graph shows changes in total cell potential versus current density.

In FIG. 6 it will be seen that there is illustrated the characteristics of a similar test cell in which 5N sulfuric acid electrolyte was used. As shown by the transition points in FIG. 6, the limiting current densities for operation below 1 volt are significantly greater than those that are observed for phospheric acid, as reflected in FIG. 5. These results indicate that the greatest depolarization, i.e. electrolysis effect in the coal slurry, is observed for electrolyte concentrations near those where the electrical conductivity through the electrode members and the electrolyte in contact therewith is at its maximum value. For that reason, the tests with sulfuric acid electrolyte were performed at a concentration of 5 Normal acid solution. In Table I, below, there is listed observed limiting current densities as a function of electrolyte temperature, for both 5 Normal sulfuric and triflic acid electrolytes and coal slurry solutions. In all these test cases, the systems behaved in a manner similar to that described previously with the tests in which phospheric acid was used as the electrolyte.

TABLE I

Limiting Current Density for 10%$_{bw}$
New Mexico Subituminous Coal Slurries

| Electrolyte | Temperature | Limiting Current Density (mA/cm²) |
|---|---|---|
| 5N H$_2$SO$_4$ | 30° C. | 4.5 |
| 5N H$_2$SO$_4$ | 55° C. | 7.8 |
| | 75° C. | 15.3 |
| 5N H$_2$SO$_4$ | 85° C. | 15.6 |
| 5N Triflic Acid | 30° C. | 3.3 |
| 5N Triflic Acid | 75° C. | 8.9 |

In order to assess the stability of the inventive process a relatively long-term test run was conducted. In that run a 5 Normal sulfuric acid electrolyte was used and its temperature was maintained at about normal ambient room temperature. A 10%$_{bw}$ coal particulate slurry solution was used and it was circulated continuously for about four days in the type of Pyrex beaker and spaced anode cathode test cell arrangement described above. A continuous current of about 5 milliamperes was maintained between the electrodes immersed in the electrolyte and slurry solution. In that test it was observed that the voltage across the cell increased from 0.8 volts to 1.1 volts over a period of four days; however, at the end of the four-day period it was found possible to recover completely by simply reversing the biasing voltage on the cell for three minutes at approximately 1.8 volts. Assuming that depolarization is due to oxidation of coal in the test slurry, then the effect is more than a surface phenomenon. It was observed that a layer, measured to be approximately 0.6 microns thick, was consumed from the respective surfaces of the approximately 100 micron diameter coal particulate granules. The consumption of such a relatively thick layer is too great to be simply called a surface phenomenon.

In order to more directly evaluate the advantages of the inventive process, and to establish that coal in the slurry and electrolyte solution was in fact being oxidized, additional test runs were performed in which the gases evolved at the sponge platinum anode in the test Pyrex beaker were collected in the type of U-shaped Pyrex tube described above. Current density and composition of the electrolyte and coal slurry solution that were used in the circulated solution of the test beaker are shown below in Table II:

TABLE II

Characteristics of Gas Sampling Runs
In Electrically Driven Electrolysis Cell

| Run # | Current Density (mA/cm²) | Run Time | Composition |
|---|---|---|---|
| 1 | 11.1 | 1 hr. | 5N H$_2$SO$_4$ |
| 2 | 2.3 | 1 hr. | 5N H$_2$SO$_4$ + 10%$_{bw}$ coal |
| 3 | 4.5 | 1 hr. | " |
| 4 | 11.1 | 1 hr. | " |

In this test, run #1 was used as a control in which no coal slurry was present. Runs 2 through 4 employed varying current densities through a 10%$_{bw}$ coal slurry of New Mexico subituminous coal in 5 Normal sulfuric acid. As seen in Table II, run #2 was well below the critical current density, run #3 was slightly below the critical current density at room temperature, and run #4 was well above the critical current density.

Table III below shows a breakdown of the composition of the cover gases following the four test run measurements reflected in Table II. Despite precautions, some air leakage occurred during the test runs. As the leak rate varied, although it was always very small, it was assumed that cover gas and air were well mixed. Thus, one could assume that the amount of argon present, as shown in Table III, was due entirely to air leakage. Accordingly, by subtracting out all of the indicated helium and argon, as well as the amounts of oxygen and nitrogen implied by the argon, one was left with what was present in cover gas due to the electrolysis of the coal slurry. The results from run #1 would bear this out as oxygen is the major component of the residual gas following accounting for air in leakage and residual helium and oxygen, which is 93% of the remaining materials. It is clear from these results that in the absence of coal, water electrolysis is being carried out, which is what one would anticipate.

TABLE III

RESULTS OF MASS SPECTROMETRIC
ANALYSIS OF COVER GAS

| | at. %, total | wt. %, neglecting He and Air | O$_2$/Ar ratio (13.79 for air sample) |
|---|---|---|---|
| Run #1 | | | |
| He | 33.57 | — | |
| H$_2$ | 1.25 | 4.12 | |
| Air | 36.52 | — | |
| CO$_2$ | 0.52 | 1.71 | |
| O$_2$ | 28.3 | 93.31 | |
| H$_2$O | 0.26 | 0.86 | — |
| Run #2 | | | |
| He | 80.20 | — | |
| H$_2$ | 2.39 | 18.83 | |
| N$_2$ | 9.10 | 29.41 | |
| CO$_2$ | 6.57 | 51.76 | |
| O$_2$ | 1.64 | — | |
| Ar | 0.11 | — | 14.91 |
| Run #3 | | | |
| He | 58.41 | — | |
| H$_2$ | 4.60 | 16.97 | |
| N$_2$ | 16.58 | 20.31 | |

TABLE III-continued
RESULTS OF MASS SPECTROMETRIC ANALYSIS OF COVER GAS

| | at. %, total | wt. %, neglecting He and Air | $O_2/Ar$ ratio (13.79 for air sample) |
|---|---|---|---|
| $CO_2$ | 17.00 | 62.72 | |
| $O_2$ | 3.18 | — | |
| Ar | 0.23 | — | 13.83 |
| Run #4 | | | |
| He | 84.96 | — | |
| $H_2$ | 1.01 | 11.58 | |
| $N_2$ | 7.45 | 29.93 | |
| $CO_2$ | 3.50 | 40.13 | |
| $O_2$ | 2.98 | 18.35 | 29.8 |
| Ar | 0.10 | — | |

Considering the second and third test runs (Table III), if one assumes that the only product evolving at the anode is $CO_2$, the theoretical yields are approximately 9% and 17%, respectively, of the cover gas volume. The actual measured values in the test of 6.57% and 17.0% would indicate a very large percentage of the anodic product was in fact observed to be $CO_2$. Of course, the air in-leakage that occurred during the tests added some uncertainly to these measured values.

Figure 7:
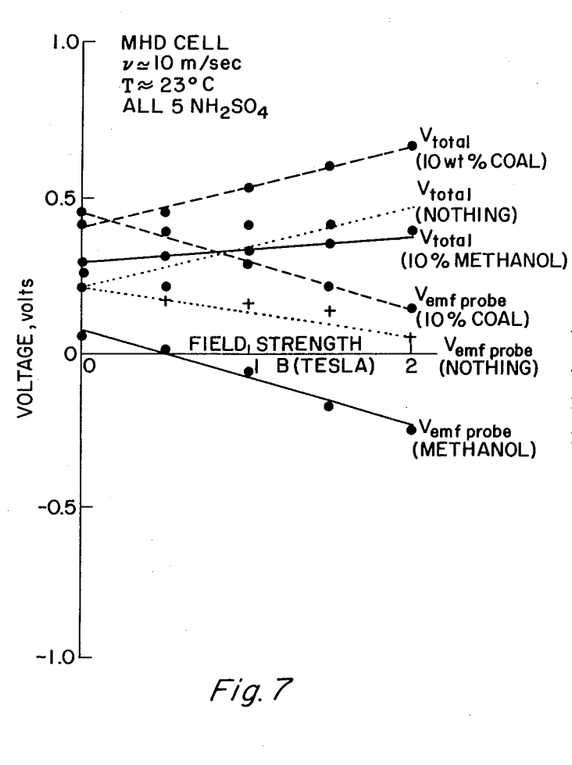
FIG. 7 is a graph of data obtained by operating a cell similar to that used for producing the data shown in FIG. 6, showing relative MHD induced voltage as a function of magnetic induction.

As indicated by Tables II and III, run No. 4 was carried out above the critical current density. At the beginning of that run the total cell voltage was measured to be approximately 1.1 volts. After approximately 8 minutes that valve was observed to increase over a ten minute span to approxemately 2.1 volts, which is characteristic of water electrolysis occurring in the cell. Consistent with those observations, the measured $O_2/Ar$ ratio is seen to be significantly higher than that measured for the air standard, where such was not the case for the second and third runs. Carbon dioxide was created during the initial, low voltage, phase and, following saturations or contamination of the electrode, primarily oxygen evolved at the anode. It is thus clear from these test results that $CO_2$ is definitely produced as a result of the electrolysis of coal-water slurries by the inventive process. Separate tests on the type of MHD reaction chamber shown in FIGS. 3 and 4 were carried out at fixed slurry and electrolyte flow rates for a range of different electrolyte solutions and slurry composition. In those tests 5N sulfuric acid was used as the electrolyte and 10%$_{bw}$ coal slurries and methanol were investigated along with a straight acid electrolyte solution. Methanlol was shown to exhibit a slight deplorization effect at very low current densities, e.g., 1-2 mA/cm². Test results from these tests are shown in FIG. 7, which illustrates the field dependence of the measured emf as a function of magnetic induction B. The test results taken were limited to a maximum applied magnetic induction of about 2 Tesla with a flow rate of about 10 meters per second for the slurry and electrolyte solution. The three curves in FIG. 7 that are labeled $V_{emf probe}$ represent the output from the two closely spaced platinum emf probes "15", shown in FIG. 3. Negative values of the emf proble are plotted in order to facilitate differentiation between the probe voltages and the magnetolyzer voltage. It can be seen that their slopes differ in sign. Furthermore, it will be noted that the lead-sulfuric acid couple biases the total cell measurements which were measured as half cell potentials relative to the central test electrode "14" (FIG. 3).

Figure 8:
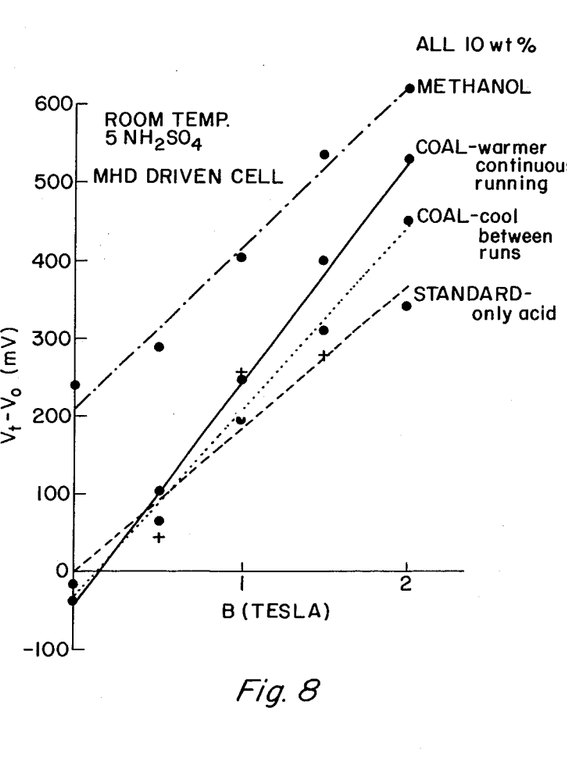
FIG. 8 is a graph of data similar to that shown in FIG. 7, except that in FIG. 8 MHD induced emf of the slurry in the test cell is shown as a function of magnetic induction.

The test results plotted in FIG. 8 more clearly show the influence of magnetic field variations upon the magnetolysis apparatus used in evaluating the inventive process, as it is illustrated in FIGS. 2-4. In FIG. 8, the potential that the coal-slurry and electrolyte stream sees at the ends of the central test electrodes 14 (FIG. 3) is plotted as a function of magnetic field induction. It is seen from the plot of the test result shown in FIG. 8 that the addition of coal concentrations to the coal-water slurry did not significantly alter the coupling between the flowing fluid and the magnetic field in such an MHD driven electrochemical reaction cell or chamber. Although the test run shown in FIGS. 7 and 8 were limited to magnetic inductions up to 2 Tesla, it is preferred in practicing the method of the invention to utilize magnetic fields of predetermined strength in excess of 2 Tesla, for example field strength of 4 Tesla or more are preferred, in order to assure that efficient magnetolysis effects ill produce a significant voltage drop across the reaction chamber 1, thereby to reduce coal in the slurry and cause $H_2$ and $CO_2$ gases to evolve from the solution, so that they may be collected in an associated gas collector, according to the invention as described above. The test results do show that the inventive process was carried out on a sufficient scale to verify that it could be operated stably for extended periods of time. Thus, the inventive process can be used to effect electrolysis of coal-water slurries to produce essentially pure hydrogen and carbon dioxide, with significantly less energy input required to operate the process than is required for simple water electrolysis. It should be recognized that unconverted coal that is discharged from the reaction chamber 1 in practicing the process of the invention can be retrieved and extracted from the MHD loop of the process, so that the salvaged coal can subsequentially be burned to drive a circulating pump or other power consuming means used in the process, thereby to effectively consume all of the energy in any coal that is used in the process.

From the foregoing discription of the invention it will be apparent to those skilled in the art that further modifications and alternative forms of it may be used without departing from the true scope of the invention. Accordingly, it is our intention to define the scope of the invention in the following claims.

We claim:

1. A process for electrochemically gasifying coal, comprising the steps of:
    (a) establishing a flowing stream including a slurry of coal particulate and a liquid, a plurality of electrode members distributed in the slurry, and an electrolyte in electrically conducting relationship with said members and the slurry,
    (b) establishing a magnetic field of predetermined strength transversely through a portion of said stream, said field being effective to electrically polarize the electrode members as they flow through the field, thereby causing said members to operate with the electrolyte to electrochemically gasify the coal particulate and generate $H_2$ and $CO_2$ gases at opposite ends, respectively, of said members,
    (c) providing gas collecting means operatively positioned to collect said gases as they rise from the slurry, and operating the gas collecting means to collect said gases.

2. A process as defined in claim 1 including the step of providing a hollow conduit for confining said stream within a predetermined channel in the portion of the stream through which said magnetic field is established, thereby to cause said field to traverse substantially the complete cross-section of the stream within said channel.

3. A process as defined in claim 2 wherein said slurry includes coal particulate in the range of about $5\%_{bw}$ to $70\%_{bw}$.

4. A process as defined in claim 3 wherein said slurry includes about $10\%_{bw}$ coal particulate, and wherein said electrolyte comprises about 5 to 10 Normal acid taken from the group consisting of sulfuric acid, phosphoric acid, acetic acid or trifluomethanesulfonic acid.

5. A process as defined in claim 2 wherein said conduit comprises a stainless steel pipe that defines said channel.

6. A process as defined in claim 1 wherein said electrode members are made of metal that has an electrical conductivity substantially higer than the electrical conductivity of said slurry.

7. A process as defined in claim 6 wherein said metal is stainless steel, and wherein said electrode members are made generally spherical in configuration.

8. A process as defined in claim 6 wherein the predetermined strength of said magnetic field is made greater than about 2 Tesla.

9. A process as defined in claim 7 wherein the temperature of said stream as it flows through said magnetic field is about the same as the ambient temperature around said field.

10. A process as defined in claim 9 wherein said ambient temperature is in the range of about 20° C. to 100° C.

11. A process as defined in claim 10 wherein said ambient temperature is about 75° C., and the current density in the portion of said electrolyte within the magnetic field is maintained in the range of about 1.5 to 3 mA/cm$^2$.

12. A process as defined in claim 5 wherein the velocity of flow of said stream in combination with the strength of said magnetic field causes a relative linear movement between the slurry and the electrode members in the range of 3 to 5 meters per second, thereby causing said slurry to scrub gas from the surfaces of the electrode members.

13. A process as defined in claim 12 wherein said electrode members are free to rotate while gas is scrubed from the surfaces thereof, whereby essentially the entire surface area of each of said electrode members is subjected to the scrubbing action of the slurry and thereby has blocking or poisoning gases removed therefrom.

* * * * *